United States Patent [19]
Kobayashi

[11] Patent Number: 5,728,990
[45] Date of Patent: Mar. 17, 1998

[54] METHOD AND APPARATUS FOR ELECTRIC DISCHARGE MACHINING STEEL-BALL GUIDE GROOVES IN LINEAR-MOTION STAGE

[75] Inventor: Mitsuo Kobayashi, Hidaka, Japan

[73] Assignee: Sigma Koki Co., Ltd., Saitama, Japan

[21] Appl. No.: 732,992

[22] Filed: Oct. 16, 1996

[30] Foreign Application Priority Data

Jun. 20, 1996 [JP] Japan .................... 8-159744

[51] Int. Cl.$^6$ .................... B23H 1/00; B23H 7/06
[52] U.S. Cl. .................... 219/69.12
[58] Field of Search .................... 219/69.12, 69.17; 384/49

[56] References Cited

U.S. PATENT DOCUMENTS

| | | | |
|---|---|---|---|
| 3,377,111 | 4/1968 | Brault | 384/49 |
| 5,242,227 | 9/1993 | Komiya et al. | 384/49 |
| 5,461,211 | 10/1995 | Yoshidaa et al. | 219/69.17 |
| 5,466,069 | 11/1995 | Agari | 384/49 |

FOREIGN PATENT DOCUMENTS

6-134622  5/1994  Japan .................... 219/69.12

*Primary Examiner*—Geoffrey S. Evans
*Attorney, Agent, or Firm*—Oliff & Berridge, PLC

[57] ABSTRACT

Method and apparatus for machining steel-ball guide grooves in guide rail portions of a linear-motion stage, whose movable member performs linear motions with respect to other movable members. In accordance with this method, first, a lower plate (2), which is an immovable member of the linear-motion stage, and an upper plate (3), which is a movable member thereof, are inserted into a recess portion (25) of a work holding element (21) in such a way that guide rail portions (4 and 5) are faced to each other. Then, the positional relation between the lower plate (2) and the upper plate (3), which are in a fixation state, is established by a pressing unit (31) and a pushing unit (32). Subsequently, a wire is inserted between the guide rail portions. Moreover, the work holding element (21) is caused by a two-dimensional motion device to perform a two-dimensional motion in a horizontal plane. Thus, guide grooves, between which steel balls are inserted, are formed in opposite surface parts of the guide rail portions (4 and 5).

5 Claims, 6 Drawing Sheets

METHOD AND APPARATUS FOR ELECTRIC DISCHARGE MACHINING STEEL-BALL GUIDE GROOVES IN LINEAR-MOTION STAGE

BACKGROUND OF THE INVENTION

1. Field of the Invention

The present invention relates to a method for machining steel-ball guide grooves in guide rail portions of a linear-motion stage, whose movable member performs linear motions with respect to a movable members, and to an apparatus for performing thereof.

2. Description of the Related Art

In laboratories or the like, linear-motion stages are used as apparatuses for causing laboratory instruments, objects of study and so on to accurately perform a linear motion. In such a linear-motion stage, an upper plate, which is a movable member, is mounted on a lower plate, which is an immovable member, through steel balls, which compose roller bearing means, in such a manner as to be able to execute a linear motion, so that the laboratory instruments, the objects of study and so on are fixed to the upper plate. In the case of a conventional linear-motion stage, two guide rail members, in each of which a steel-ball guide groove is formed, are provided on the bottom surface of the upper plate in such a way that a space is left therebetween. Further, each of steel-ball guide grooves of the lower plate, which are placed between the guide rail members, is faced to a corresponding one of the steel-ball guide grooves of the guide rail members in the lateral direction. Thus, steel balls are inserted between each steel-ball guide groove of the lower plate and a corresponding one of the steel-ball guide grooves of the guide rail members.

This conventional linear-motion stage requires at least four members, namely, an upper plate, a lower plate and guide rail members. This causes problems in that the configuration of the stage is complexed and that an operation of fabricating the stage is complicated. However, as a linear-motion stage which solves such problems, there has been known a linear-motion stage in which guide rail portions facing each other are provided in each of the upper plate and the lower plate thereof and steel balls are inserted into guide grooves formed in these guide rail portions. In the case of this linear-motion stage, the machining of guide grooves is performed on each of the upper plate and the lower plate thereof so as to form guide grooves in surface parts, which face each other, of the guide rail portions of each of the upper plate and the lower plate thereof.

The linear-motion stage is a precision device in which the upper plate is required to move with respect to the lower plate accurately and smoothly. It is, thus, necessary that the shape of each of the guide grooves is formed with high accuracy correspondingly to the shape of each steel ball and that the positional relation between each steel ball and the corresponding guide groove is established highly precisely. However, in the case of the aforementioned conventional linear-motion stage, it is difficult to form the shape of each of the guide grooves corresponding to each steel ball, which are machined in each of the upper plate and the lower plate, with high accuracy and to determine the positional relation between each steel ball and the corresponding guide groove highly precisely.

The present invention is accomplished to solve such a drawback of the conventional linear-motion stage.

It is, accordingly, an object of the present invention to provide a method for machining steel-ball guide grooves in a linear-motion stage, whereby guide grooves, between which steel balls are inserted, can be formed with high accuracy.

Further, it is another object of the present invention to provide a device to be used for performing such a method.

SUMMARY OF THE INVENTION

To achieve the foregoing objects, in accordance with an aspect of the present invention, there is provided a method for machining steel-ball guide grooves in a linear-motion stage, which comprises the steps of: establishing a fixation-state positional relation between an immovable member and a movable member that are in a fixation (or stationary) state in which guide rail portions respectively provided in the movable member and the immovable member and used for guiding a linear motion of the movable member with respect to the immovable member are faced to each other; using a wire, which is inserted into a space between the guide rail portions, as one of electrodes for electric discharge machining, and using the immovable member and the movable member as the other of the electrodes; and causing the immovable member and the movable member to perform two-dimensional motions on a plane perpendicular to a direction, in which the wire extends, by maintaining the fixation-state position relation therebetween, thereby forming guide grooves, which are used for guiding steel balls to be inserted the guide rail portions, in surface parts of guide rail portions, which face each other, by electric discharge machining.

Thus, in accordance with such a machining method, the immovable member and the movable member perform two-dimensional motions on a plane perpendicular to a direction, in which the wire extends, by maintaining the fixation-state positional relation therebetween. Thereby, the shapes of the two guide grooves formed in the surface parts of the guide rail portions by electric discharge machining can be formed correspondingly to those of the steel balls with high precision. Moreover, the positional relation therebetween can be established correspondingly to the steel balls with high accuracy. Consequently, roller bearing means consisting of the two guide grooves and the steel balls can cause the movable member to perform a linear motion with respect to the immovable member accurately and smoothly.

In the method described hereinabove, the immovable member and the movable member may be placed at positions arranged in a vertical direction, respectively. In other words, the immovable member and the movable member may be provided as upper and lower plates. Alternatively, the immovable member and the movable member may be placed at positions arranged in a lateral direction, respectively. In other words, the immovable member and the movable member may be provided as two side plates.

Further, the immovable member and the movable member may be plate-like ones. Alternatively, the immovable member and the movable member may be block-like ones. Namely, the shapes of the immovable member and the movable member are arbitrarily determined.

Further, the two-dimensional motion may be a mere circular motion. Alternatively, the two-dimensional motion may be a complicated one which is realized by providing a depression portion, which is used for holding lubricating oil, in each of the guide grooves.

In the case that the guide groove is finished with high precision by honing after the guide grooves for guiding steel balls to be inserted between the guide rail portions are formed in the surface parts, which face each other, of the guide rail portions by electric discharge machining, it is preferable that the honing process is performed by maintaining the aforementioned fixation-state positional relation between the immovable member and the movable member put into a fixation state.

Thereby, the positional relation between the guide grooves at the time of finishing the electric discharge machining is maintained until the honing process is started. Consequently, the guide grooves are finished with high accuracy by honing. Namely, in accordance with the present invention, the steel-ball guide grooves are formed in the surface parts, which face each other, of the guide rail portions by performing the electric discharge machining after the positional relation between the immovable member and the movable member corresponding to the fixation state of these members is established.

Further, in accordance with another aspect of the present invention, there is provided an apparatus for machining steel-ball guide grooves in guide rail portions of a linear-motion stage, whose movable members performs linear motions with respect to a movable members, which comprises a work holding element having a recess (or concave) portion into which an immovable member and a movable member composing a linear-motion stage are inserted in a state in which guide rail portions being respectively provided in the immovable member and the movable member and being used for guiding a linear-motion of the movable member with respect to the immovable member are faced to each other. A hole, through which an electric discharge machining wire inserted between the guide rail portions passes, is formed in the bottom part of the recess portion. The apparatus further comprises a two-dimensional motion device for causing the work holding element to perform a two-dimensional motion in a direction perpendicular to a direction in which the wire extends; and pushing means that is interposed between the immovable member and the movable member and is operative to push the immovable member and the movable member in opposite directions against inner walls of the recess portion, respectively.

In the case of this machining apparatus, when the immovable member and the movable member are inserted into the recess portion of the work holding element and are further pushed against the opposed inner walls of the recess portion, respectively, there is established the positional relation between the immovable member and the movable member which are in the fixation state. Thereby, if the work holding element is caused by the two-dimensional motion device to perform a two-dimensional motion, steel-ball guide grooves are formed in surface parts, which are opposed to each other, of the guide rail portions by the electric discharge machining that utilizes the wire.

Thus, in the case of this machining apparatus, an operation of inserting the immovable member and the movable member into the recess portion of the work holding element and pushing these members against the opposite inner walls of the recess portion suffices for establishing the stationary position relation between these member which are in the fixation state. Consequently, the facilitation of the operation of the apparatus, as well as the simplification of the structure of the apparatus, can be achieved.

The work holding element may be constituted by a single block. Alternatively, the work holding element may be constituted by the combination of a plurality of members.

Further, the width of the recess portion of the work holding member may be in exact agreement with that of each of the immovable member and the movable member. Alternatively, the width of the recess portion thereof may be wider than that of each of the immovable member and the movable member.

In the case where the width of the recess portion thereof may be wider than that of each of the immovable member and the movable member, the work holding element is provided with pressing means for pressing the immovable member and the movable member from one side to the other side in a direction of width thereof and for pressing the immovable member and the movable member against the inner walls of the recess portion.

The aforesaid pushing means, which is interposed between the immovable member and the movable member and is used for pushing the immovable member and the movable member in opposite directions, respectively, and for pushing the immovable member and the movable member against the inner walls of the recess portion may be constituted by a single component, for example, a wedge-like member. Alternatively, the pushing means may be composed of a plurality of components, for instance, two components.

An example of the pushing means consisting of a plurality of components has a threaded shank member and a nut member into which this threaded shank member is screwed. Further, a taper part tapered down in a direction, in which the threaded shank member is screwed, is formed thereon. Moreover, an expanding slot extending in the direction, in which the threaded shank member is screwed, is formed in the nut member.

In the case of this pushing means, when the threaded shank member is inserted and screwed into the nut member, the nut member undergoes an extending (or spreading-out) force exerted from the taper part thereon. Then, the nut member is spread out and deformed owing to the presence of the expanding slot. Thus, the nut member pushes the immovable member and the movable member in opposite directions. Consequently, the nut member pushes the immovable member and the movable member against the opposite inner walls of the recess portion of the work holding element, respectively. Further, a pushing force can be adjusted to a suitable strength by regulating the length of a part, which is advanced, namely, screwed and inserted into the nut member, of the threaded shank member.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Figure 1:
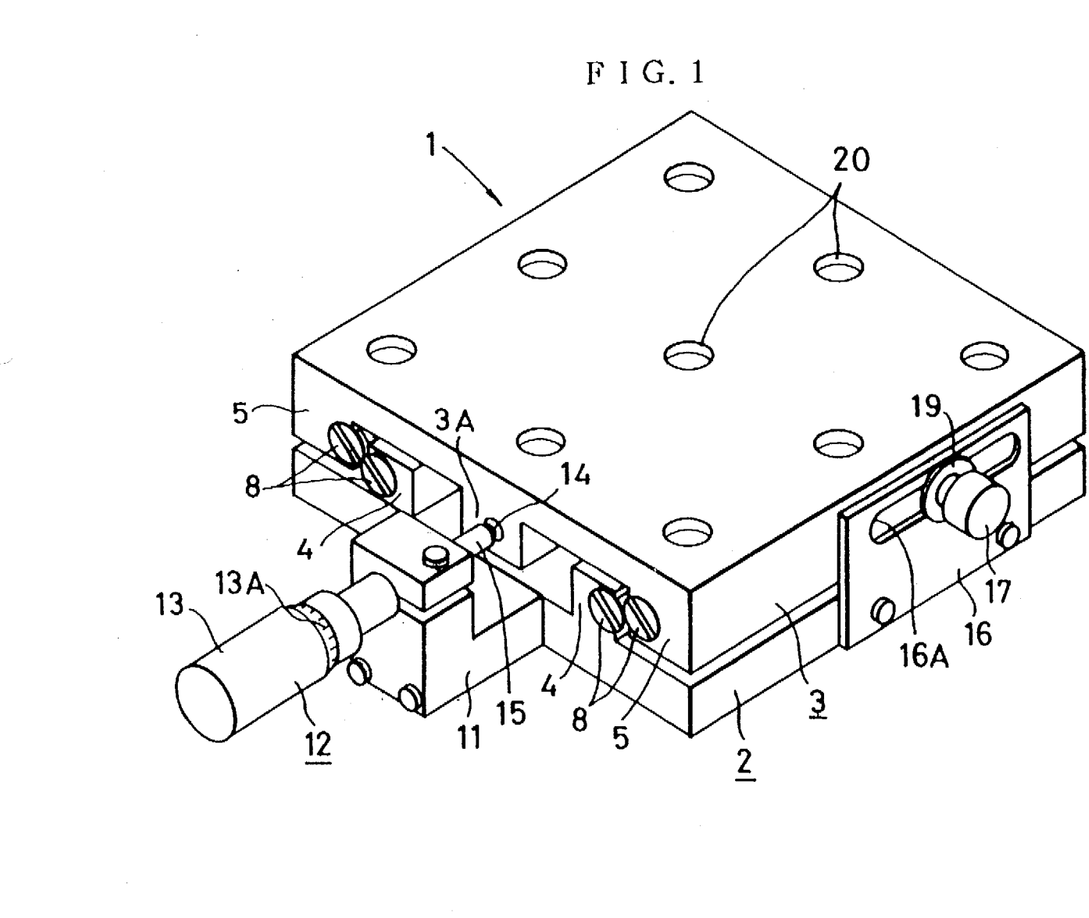
FIG. 1 is a perspective diagram for illustrating the entire configuration of a linear-motion stage.
Figure 2:
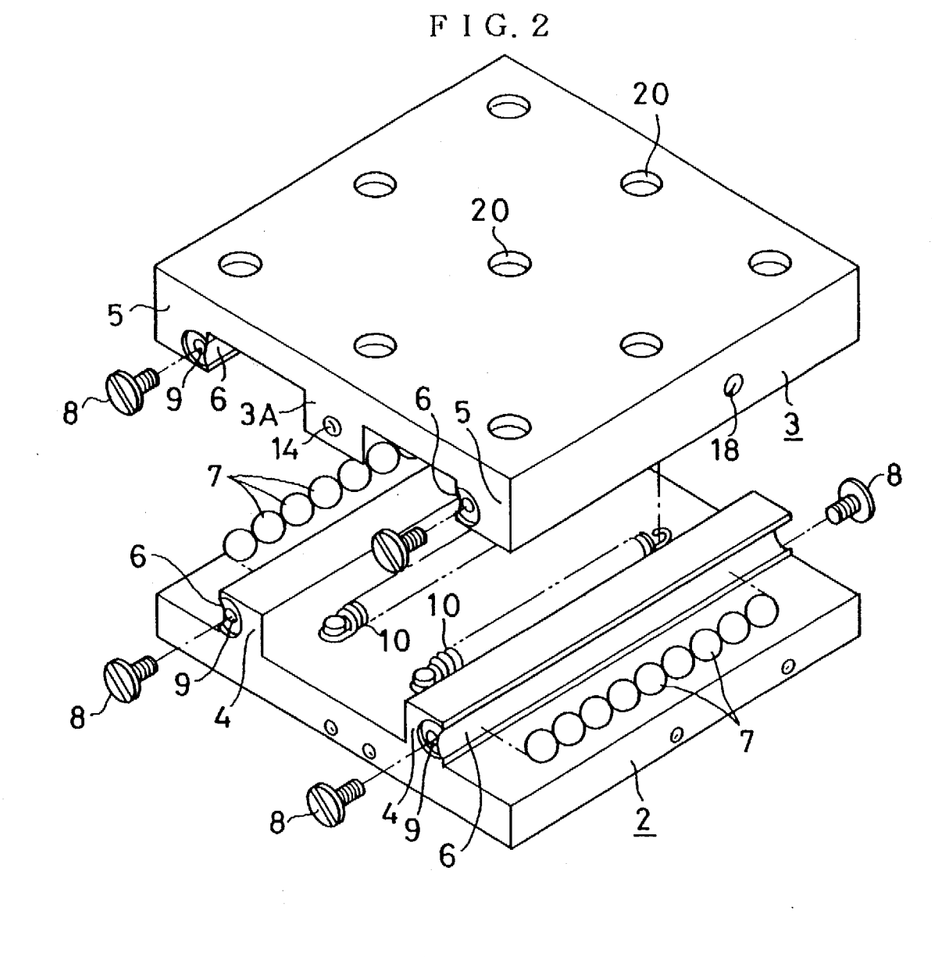
FIG. 2 is an exploded perspective diagram for illustrating primary members of the linear-motion stage of FIG. 1.

Hereinafter, the preferred embodiment of the present invention will be described in detail by referring to the accompanying drawings. First, a linear-motion stage will be described hereinbelow. FIG. 1 is a perspective diagram for illustrating the entire configuration of the linear-motion stage 1. FIG. 2 is an exploded perspective diagram for illustrating primary members of the linear-motion stage 1 of FIG. 1.

The linear-motion stage 1 is composed of a lower plate 2, which is fixed to a laboratory table (or a working table) or the like and becomes an immovable member, and an upper plate 3 that is a movable member which can perform a linear motion with respect to this lower plate 2. Double-guide-rail portions 4 and 5 are provided on the top surface of the lower plate 2 and the bottom surface of the upper plate 3 in such a manner as to be projected therefrom, respectively. Each of the guide rail portions 4 of the lower plate 2 faces the corresponding one of the guide rail portions 5 of the upper plate 3 in the direction of the width of each of the lower plate 2 and the upper plate 3. As shown in FIG. 2, a guide groove 6 is formed in the opposite surface parts of each pair of the guide rail portions 4 and 5, which are faced to each other. Steel balls 7 are inserted between the opposite guide grooves 6. Screw holes 9, into each of which a cap screw 8 is screwed, are bored in both end parts of each of the guide rail portions 4 and 5. The steel balls 7 are prevented by the large-diameter head part of the cap screw 8 from slipping out of the end part of each of the guide rail portions 4 and 5.

Further, two coil (or helical) springs 10 extending in the direction of the length of each of the guide rail portions 4 and 5 are placed between the lower plate 2 and the upper plate 3. An end and the other end of each of these coil springs 10 are connected to the lower plate 2 and the upper plate 3, respectively. Thus, when the coil spring 10 reaches a length in excess of the "natural length" (namely, the (tension-)free length) thereof, the upper plate 3 executes a linear motion with respect to the lower plate 2.

As illustrated in FIG. 1, a screw feeding means 12 is attached to the front surface of the lower plate 2 through a bracket 11. This screw feeding means 12 is adapted in such a manner that a spindle 15 having been brought into an abutting engagement with a pressure member 14 of the upper plate 3 is advanced and retreated by a screw feeding mechanism when a turn knob 13 is turned in the normal direction (namely, turned forward) and in the reverse direction (or turned reversely). A stopper plate 16 is fixed to a side surface of the lower plate 2. A screw hole 18 of FIG. 2, into which a threaded shank portion provided at an end part of a stopper screw 17 is screwed, is bored in a side surface portion of the upper plate 3. After inserted through a washer 19 and an elongated hole 16A of the stopper plate 16, this threaded shank portion is screwed into the screw hole 18. Further, when tightening up the stopper screw 17 completely, the upper plate 3 placed in this position is put into a fixation state, in which the upper plate 3 is fixedly secured to the lower plate 2, by the friction force caused by the washer 19 and the stopper plate 16 which are pushed by the head portion of the stopper screw 17.

Thus, when loosening the stopper screw 17 and further turning the turn knob 13 in the normal direction, the spindle 15 is advanced. Consequently, the upper plate 3 advances with respect to the lower plate 2 while stretching the coil spring 10. In contrast, when the turn knob 13 is turned in the reverse direction, the upper plate 3 is retreated by the restoring (spring) force of the coil spring 10 as the spindle 15 retreats. When the upper plate 3 reaches a desired position relative to the upper plate 2, the upper plate 3 can be fixed in this position by tightening the stopper screw 17. Therefore, in case that a laboratory instrument or an object of study is attached to the upper plate 3 with bolts by utilizing bolt holes bored in the top surface portion of the upper plate 3, this laboratory instrument or the object of study is moved by a distance corresponding to a graduation 13A marked on the turn knob 13, so that the laboratory instrument or the object can be stopped at such a point.

The aforementioned linear-motion of the upper plate 3 with respect to the lower plate 2 is performed by utilizing the rolling of the steel balls 7 inserted between the guide grooves 6 of the guide rail portions 4 and 5. Thus, the accuracy in machining the guide grooves 6 correspondingly to the steel ball is an important factor that affects linear-motion accuracy.

FIGS. 3 to 7 illustrate a method for machining the guide grooves 6 in the guide rail portions 4 and 5 of the lower plate 2 and the upper plate 3 and further illustrate devices to be used for performing this method. The lower plate 2 and the upper plate 3 are produced from plate-like materials by milling and are shaped into forms respectively having the guide rail portions 4 and 5. Moreover, the aforesaid screw hole 9 and the aforementioned bolt hole 20 are formed therein by drilling and threading. Furthermore, the lower plate 2 and the upper plate 3 undergo quenching, surface-grinding and surface-coating operations.

Figure 3:
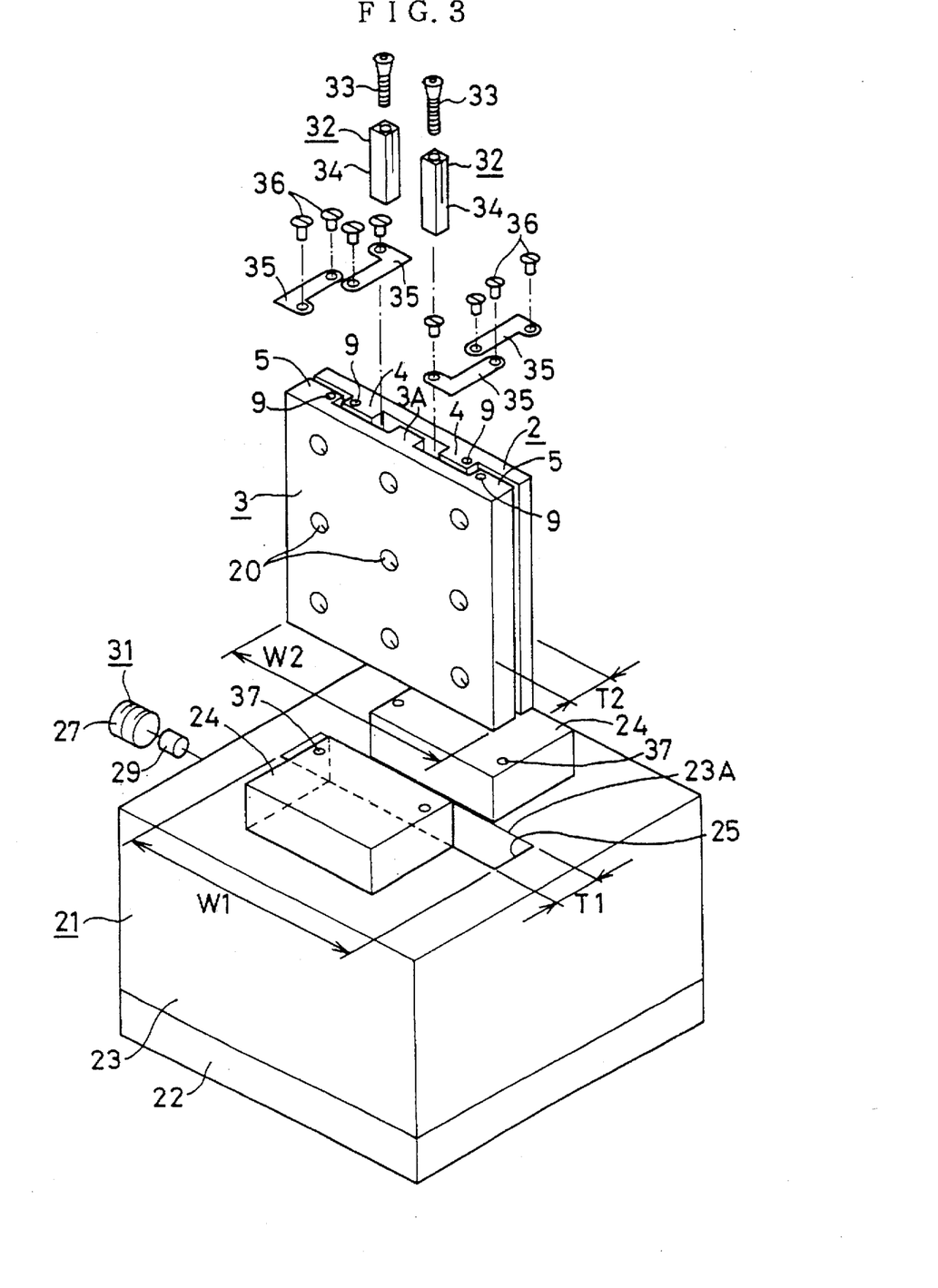
FIG. 3 is a perspective diagram for illustrating a word holding element which is in a state before a lower plate, which is an immovable member, and an upper plate, which is a movable member, are inserted thereinto.
Figure 6:
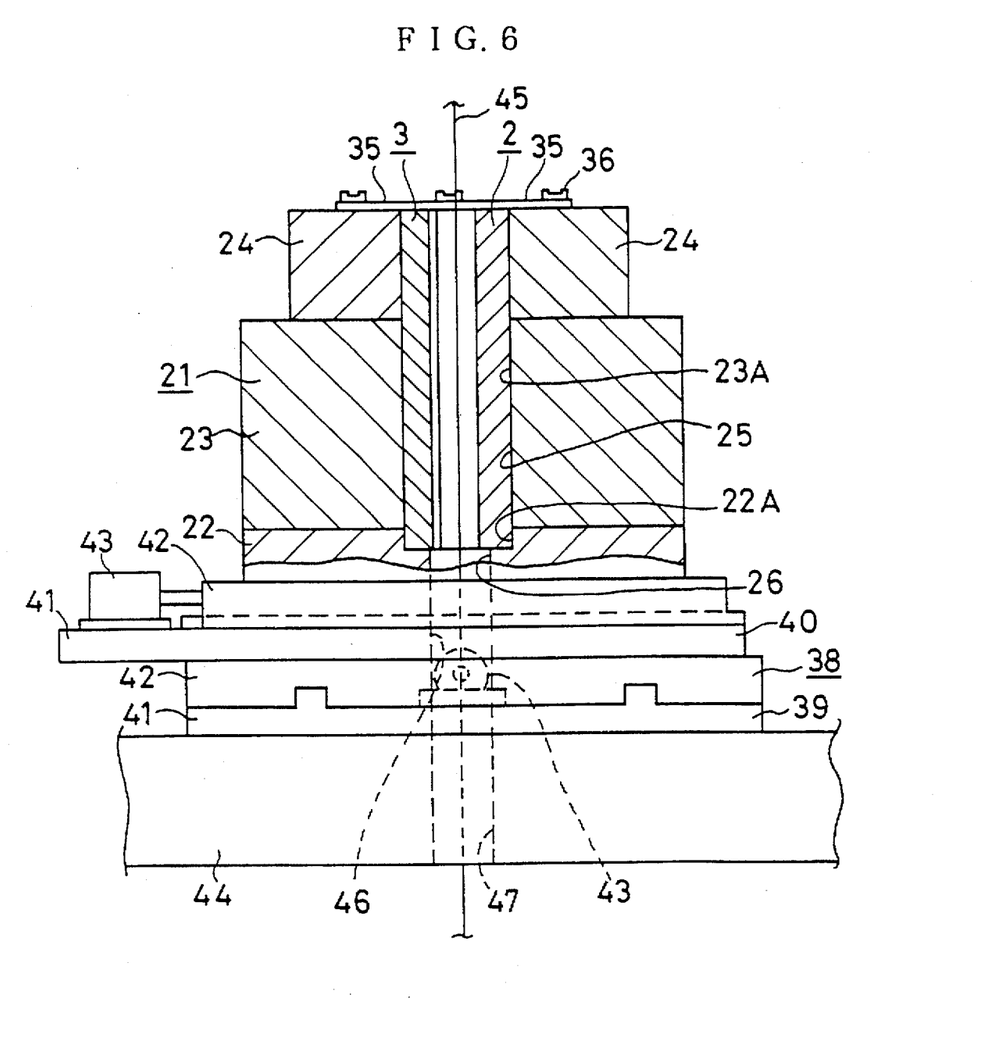
FIG. 6 is a partially sectional front view for illustrating a state in which the work holding element is mounted on a two-dimensional motion device and is thus set on a working table of an electric discharge machining apparatus.

FIG. 3 shows a work holding element 21 to be used for forming the guide grooves 6 in the guide rail portions 4 and 5 of the lower plate 2 and the upper plate 3 by electric discharge machining. This work holding element 21 has a base board 22, a main body 23 connected to the base board 22 and two pedestals 24 fixed onto the main body 23. As shown in FIG. 6, a through hole 23A is bored in the main body 23 in such a way as to extend from the top surface to the bottom surface thereof. A depression portion 22A is formed in a part of the base board 22, which corresponds to this through hole 23A. A concave portion 25 having an elongated rectangular longitudinal section, into which the lower plate 2 and the upper plate 3 to be used as works are inserted longitudinally (namely, in such a manner that the longitudinal direction of the guide rail portions 4 and 5 is in agreement with the vertical direction), is formed in the work holding element 21.

As illustrated in FIG. 3, the width W1 of the concave portion 25 is somewhat larger than that of each of the lower plate 2 and the upper plate 3. Further, the depth T1 of the concave portion 25, which is perpendicular to the width thereof, is equal to a total dimension T2 (namely, the thickness T2 of the linear-motion stage 1) of the thicknesses of the lower plate 2 and the upper plate 3, which face to each other by being spaced by a predetermined distance. Further, the two pedestals 24 are placed on both sides of the concave portion 25. Moreover, as shown in FIG. 6, a hole 26 is formed in the bottom portion of the work holding element 21.

Figure 5:
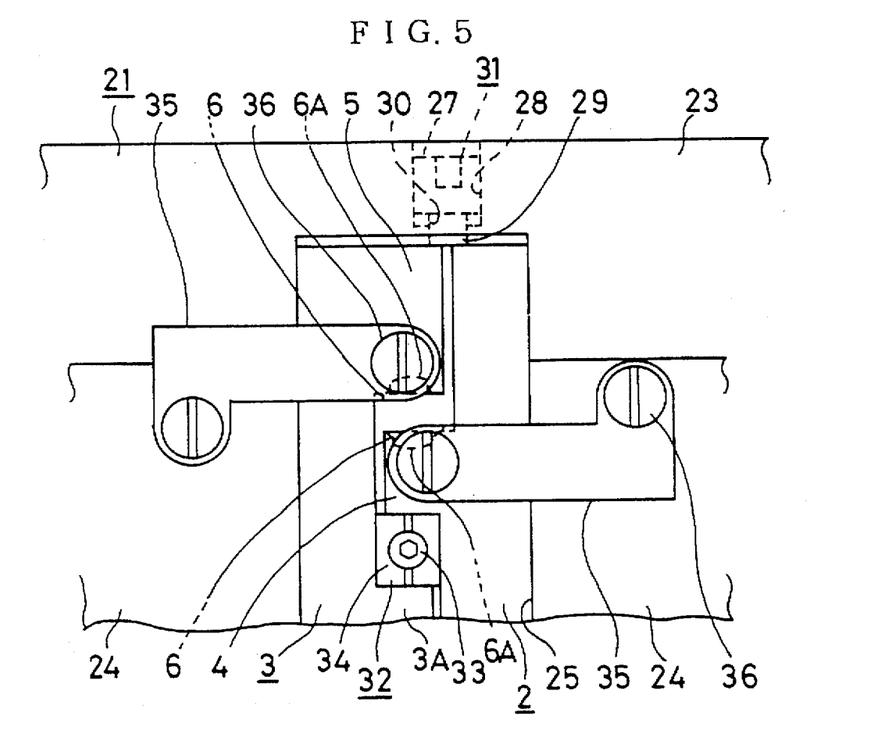
FIG. 5 is a partially enlarged diagram for illustrating the word holding element which is in a state after the lower plate and the upper plate of FIG. 3 are inserted thereinto.

Furthermore, as shown in FIG. 5, a screw hole 28, into which a set screw 27 is screwed, is dug (or countersunk) in a side surface portion of the work holding element 21. A small-diameter hole 30, into which a spacer 29 is inserted, is drilled just under a bottom part of the screw hole 28 in such a way as to reach the concave portion 25. The set screw 27 and the spacer 29 compose a pressing means 31 that is operative to press the lower plate 2 and the upper plate 3, which are inserted into the concave portion 25, in the direction of the width (namely, in the transverse direction) of each of these plates from one side to the other side of each of these plates against the inner walls of the concave portion 25.

Figure 4:
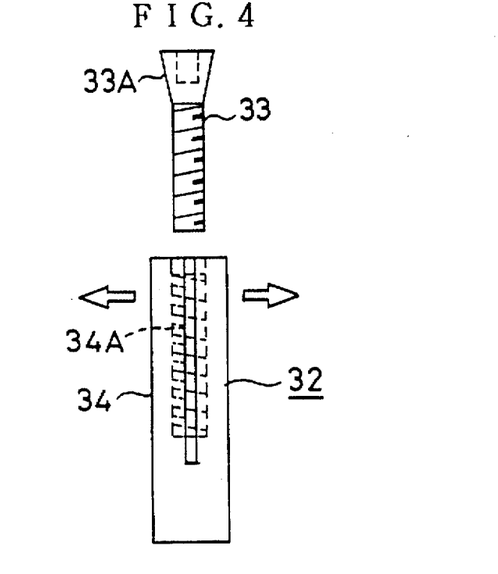
FIG. 4 is a front view of a threaded shank member and a nut member, which are composing elements of pushing means.

In the case of this embodiment, a pushing means 32 of FIG. 4 for pushing the lower plate 2 and the upper plate 3 in opposite directions and for pushing these plates against the inner walls of the concave portion 25 is also used. This pushing means 32 consists of a threaded shank portion 33 and an elongated rectangular nut member 34 into which the threaded shank member 33 is screwed. A neck portion of the threaded shank member 33 is a taper portion 33A that tapers down in the direction in which the threaded shank member 33 is advanced, namely, screwed into the nut member 33. An expanding slot 34A extending in the direction of screwing the threaded shank member 33 is formed in the longitudinal direction of the nut member 34 in the nut member 33. When the threaded shank member 33 screwed into the nut member 34 is further tightened by using a tool such as a hexagon wrench, the nut member is spread out and deformed from the expanding slot by an extending (or spreading-out) force exerted by the taper part thereon.

In order to make the work holding element 21 hold the lower plate 2 and the upper plate 3, these plates 2 and 3 are stuck to each other and are then inserted into the concave portion 25. Subsequently, the lower plate 2 and the upper plate 3 are pressed by the pressing means 3 against the inner walls in the direction of the width of the concave portion 25. Further, as shown in FIG. 3, the two nut members 34 are respectively inserted into spaces between the lower plate 2 and the upper plate 3, more practically, spaces provided at both sides of a convex ridge portion 3A formed between the two guide rail portions 5 of the upper plate 3. Then, the nut member 34 is spread out and deformed by screwing the threaded shank member 33 thereinto by performing an operation of turning the tool. Thereby, the lower plate 2 and the upper plate 3 are pressed by the nut member 34 in opposite directions and are thus pressed against the two opposed inner walls of the concave portion 25.

Consequently, the lower plate 2 and the upper plate 3 are put into a fixation state in which the positional relation between these plates 2 and 3 is established so that the guide rail portions 4 and 5 are faced to each other in the direction of the width of the lower plate 2 and the upper plate 3. Thus, these plates 2 and 3 are held in the concave portion 25 of the work holding element 21. This positional relation is a correct positional relation between the lower plate 2 and the upper plate 3 in the case that the linear-motion stage 1 is fabricated from the lower plate 2, the upper plate 3 and so on.

Next, this embodiment performs an operation of stretching (or extending) current-carrying (or conductive) plates 35 between the lower plate 2 and one of the pedestals 24 and between the upper plate 2 and the other of the pedestals 24, respectively. Practically, this operation is performed as follows. First, set screws 36 are inserted into holes provided at both end portions of each of the conductive plates 35, respectively. Further, pairs of set screws 36, which respectively correspond to the lower plate 2 and the upper plate 3, are screwed into the screw holes 9 preliminarily bored in the lower plate 2 and the upper plate 9. Moreover, set screws 36 corresponding to the pedestals 24 are screwed into corresponding screw holes 37 preliminarily bored in the pedestals 24, respectively. Thereby, the surface-coating of the lower plate 2 and the upper plate 3 is performed as above described. As a result, even when the surface part of each of the lower plate 2 and the upper plate 3 is in a non-conducting state, portions between the lower plate 2 and the work holding element 21 and between the upper plate 3 and the element 21 are brought into a conducting state through the conductive plates 35 and the set screws 36. Thus, the work holding element 21, in which the lower plate 2 and the upper plate 3 are inserted and set in the concave portion 25, is fixed onto the top surface of a two-dimensional motion device 38 of FIG. 6. This two-dimensional motion device 38 is used to cause the work holding element 21 to perform a two-dimensional motion on a horizontal plane. Further, this two-dimensional motion device 38 is composed of first and second motion means 39 and 40. Each of these motion means 39 and 40 has a lower base plate 41 and an upper moving plate 42. The moving plate 42 is advanced to and is retreated from the base plate 41 by a drive means 43 consisting of a motor, a feed screw mechanism and so forth. Further, the direction of movement of the moving plate 42 of the first motion means and that of movement of the moving plate 42 of the second motion means 40 are two directions which form a right angle in a horizontal plane. Because the base plate 41 of the second motion means 40 is fixed onto the moving plate 42 of the first motion means 39, the work holding element 21 (in other words, the lower plate 2 and the upper plate 3 held by the work holding element 21) can be moved in a two-dimensional manner on the horizontal plane by driving the drive means 43 of each of the first motion means 39 and the second motion means 40 under the control of a control unit (not shown).

The two-dimensional motion device 38 described hereinabove is set on a working table 44 of an electric discharge machining apparatus of FIG. 6. After this setup of the device 38, an electric-discharge-machining wire 45 of the electric discharge machining apparatus is unreeled from a supply reel and is further inserted between the guide rail member 4 of the lower plate 2 and the guide rail portion 5 of the upper plate 3 in the longitudinal or vertical direction. Moreover, the wire 45 is inserted into the hole 26 formed in the bottom portion of the work holding element 21 and a hole 46 formed in each of the composing members of the two-dimensional motion device 38. Furthermore, the tip end of the wire 45 is put around a take-up reel. Additionally, a tension is exerted on the wire 45 by a tension mechanism.

Thereafter, this embodiment starts an operation of forming the guide grooves 6 in the guide rail portions 4 and 5 by the electric discharge machining. This electric-discharge-machining operation is performed by using the wire 45 as one of electrodes therefor, and further using the work holding element 21, which is connected to the lower plate 2 and the upper plate 3 through the conductive plate 35 and so on, as the other of the electrodes. Moreover, while automatically feeding the wire 45, a working fluid is supplied to the periphery of the wire 45. Furthermore, the two-dimensional motion device 38 causes the work holding element 21 to perform a two-dimensional motion.

Thereby, the guide grooves 6, whose shapes correspond to those of the aforementioned steel balls 7 inserted therebetween, are formed in the surface part of each of the guide rail portions 4 of the lower plate 2 and the surface part of the corresponding guide rail portion 5 of the lower plate 3, which are faced to each other. Each of these guide grooves 6 is formed in such a way as to have a size corresponding to that of each of the steel balls 7 inserted therebetween and to have a depression portion 6A for storing lubricating oil to be supplied to the steel balls 7. The guide grooves 6 having such a complex form are accurately machined by driving the two drive means 43 of the two-dimensional motion device 38, which is numerically controlled by the control unit. Incidentally, in the case where the conductive plates 35 and the set screws 36 project into a machining region, in which the machining is performed by using the wire 45, as shown in FIG. 5, the machining of the guide grooves 6 is carried out by cutting off the projected parts of the conductive plates 35 and the set screws 36.

The aforementioned electric discharge machining of the guide grooves 6 by using the wire 45 is performed by resetting the wire 45 in each of the two guide rail portions 4 and 5, which are respectively provided on the lower plate 2 and the upper plate 3. If two wires are provided in the electric discharge machining apparatus, these grooves can be machined simultaneously. Alternatively, the guide grooves may be machined by an electric discharge machining apparatus equipped with one or more wires and with a large work holding element which is provided with a plurality of concave portions 25 so that the single work holding element holds a plurality of plate sets, each of which has a single lower plate 2 and a single upper plate 3.

Figure 7:
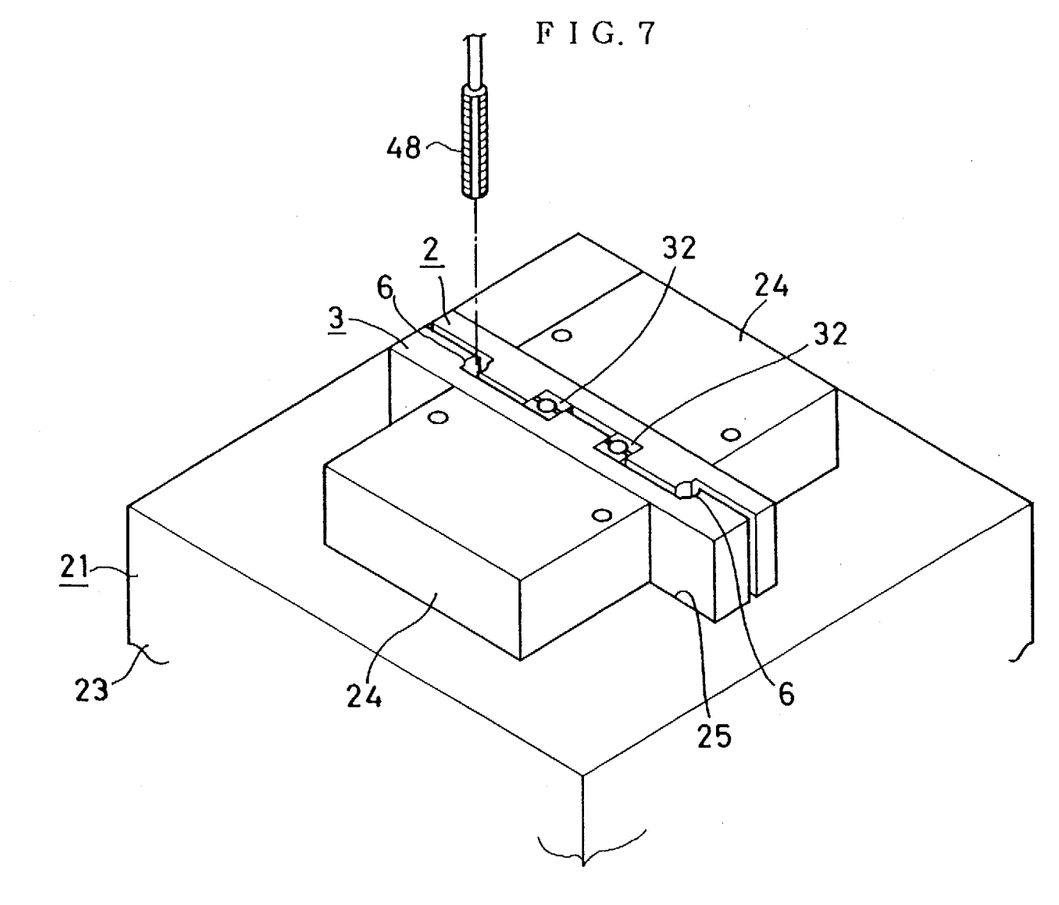
FIG. 7 is a perspective diagram for illustrating a state at the time of performing a honing process after performing an electric discharge machining process.

Thereafter, the work holding element 21 is set in a honing machine of FIG. 7 by removing the conductive plates 35, alternatively, leaving the conductive plates 35 and by maintaining the positional relation between the lower plate 2 and the upper plate 3 that are inserted in the concave portion 25 of the work holding element 21 and are in the aforementioned fixation state. Further, the guide grooves 6 are finished by inserting the rotary machining head 48 of the honing machine into a space between the guide grooves 6.

In the case of this embodiment described hereinabove, the lower plate 2 and the upper plate 3 inserted into the concave portion 25 of the work holding element 21 perform two-dimensional motions on a horizontal plane by maintaining the positional relation between the lower plate 2 and the upper plate 3 that are put in the fixation state in which the guide rail portions 4 and 5 are faced to each other. Thus, by making the range of the two-dimensional motion correspond with the size of the steel balls 7, the shapes of the two guide grooves 6 formed in the opposed surface parts of the guide rail portions 4 and 5 by electric discharge machining can be formed correspondingly to those of the steel balls 7 with high precision as required. Moreover, the positional relation between the two guide grooves 6 can be established correspondingly to the steel balls 7 with high accuracy as required. Consequently, the roller bearing means consisting of the two guide grooves 6 and the steel balls 7 can cause the upper plate 3, which is the movable member, to perform a linear motion with respect to the lower plate 2, which is the immovable member, accurately and smoothly.

Further, in the case of this embodiment, when the guide grooves 6 are finished by honing after the guide grooves 6 are formed in the surface parts, which face with each other, of the guide rail portions 4 and 5 by electric discharge machining, the honing is performed by maintaining the aforementioned fixation positional relation between the lower plate 2 and the upper plate 3, which are put into the stationary state, at the time of terminating the electric discharge machining. Thus, the positional relation between the guide grooves at the time of finishing the electric discharge machining is maintained until the honing is started. Consequently, the guide grooves 6 are finished with high accuracy by honing.

Moreover, the following operation suffices for establishing the fixation-state position relation between these member which are in the fixation state. Namely, the lower plate 2 and the upper plate 3 are inserted into the recess portion 25 of the work holding element 21. Then, the lower plate 2 and the upper plate 3 are positioned and pushed against the walls in the direction of the width of the recess portion 25 by means of the pressing means 31. Moreover, the lower plate 2 and the upper plate 3 are pushed in opposite directions by the pushing means 32 consisting of the threaded shank portion 33 and the nut member 34. Thereby, the lower plate 2 and the upper plate 3 are pushed against the opposite inner walls of the concave portion 25. Consequently, the facilitation of the operation of the apparatus, as well as the simplification of the structure of the apparatus, can be achieved.

Furthermore, the pushing means 32 consists of the threaded shank member 33, which is provided with the taper portion 33A, and the nut member 34 in which the expanding slot 34A is formed. Thus, the nut member is spread out and deformed by inserting and screwing the threaded shank member 33 into the nut member 34. Thereby, the pushing means 32 can securely pushes the lower plate 2 and the upper plate 3 against the opposite inner walls of the concave portion 25. Further, a pushing force can be adjusted to a suitable strength by regulating the length of a part, which is screwed and inserted into the nut member, of the threaded shank member 33.

Although the preferred embodiment of the present invention has been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A method for machining steel-ball guide grooves in a linear-motion stage, which comprising the steps of:

establishing a fixation-state positional relation between an immovable member and a movable member that are in a fixation state in which guide rail portions being respectively provided in the movable member and the immovable member and being used for guiding a linear motion of the movable member with respect to the immovable member are faced with respect to each other;

using a wire, which is inserted into a space between the guide rail portions, as one of electrodes for electric discharge machining, and using the immovable member and the movable member as the other of the electrodes; and forming guide grooves, which are used for guiding steel balls to be inserted the guide rail portions, by electric discharge machining in surface parts of guide rail portions, which face each other, by causing the immovable member and the movable member to perform two-dimensional motions on a plane perpendicular to a direction, in which the wire extends, by maintaining the fixation-state position relation therebetween.

2. The method according to claim 1, wherein upon completion of forming the guide grooves, a honing of the guide grooves is performed by maintaining the aforementioned fixation-state positional relation between the immovable member and the movable member put into a fixation state.

3. An apparatus for machining steel-ball guide grooves in guide rail portions of a linear-motion stage, whose movable members performs linear motions with respect to a movable members, comprising:

a work holding element having a recess portion into which an immovable member and a movable member composing a linear-motion stage are inserted in a state in which guide rail portions being respectively provided in the immovable member and the movable member and being used for guiding a linear-motion of the movable member with respect to the immovable member are faced with each other, a hole, through which an electric discharge machining wire inserted between the guide rail portions passes, being formed in the bottom part of the recess portion;

a two-dimensional motion device for causing the work holding element to perform a two-dimensional motion in a direction perpendicular to a direction in which the wire extends; and pushing means that is interposed between the immovable member and the movable member for pushing the immovable member and the movable member in opposite directions against inner walls of the recess portion, respectively.

4. The apparatus according to claim 3, wherein a width of the recess portion thereof is wider than that of each of the immovable member and the movable member, wherein the work holding element has pressing means for pressing the immovable member and the movable member from one side to the other side in a direction of width thereof and for pressing the immovable member and the movable member against the inner walls of the recess portion.

5. The apparatus according to claim 3 or 4, wherein the pushing means has a threaded shank member and a nut member into which this threaded shank member is screwed, wherein a taper part, which is tapered down in a direction in which the threaded shank member is screwed, is formed thereon, wherein an expanding slot extending in the direction, in which the threaded shank member is screwed, is formed in the nut member.

\* \* \* \* \*